US009029701B2

(12) United States Patent
Hara

(10) Patent No.: US 9,029,701 B2
(45) Date of Patent: May 12, 2015

(54) WIRE HARNESS PROTECTOR

(75) Inventor: Kazuo Hara, Mie (JP)

(73) Assignee: Sumitomo Wiring Systems, Ltd., Mie (JP)

(*) Notice: Subject to any disclaimer, the term of this patent is extended or adjusted under 35 U.S.C. 154(b) by 130 days.

(21) Appl. No.: 13/997,804

(22) PCT Filed: Jun. 15, 2011

(86) PCT No.: PCT/JP2011/063645
§ 371 (c)(1),
(2), (4) Date: Jun. 25, 2013

(87) PCT Pub. No.: WO2012/098705
PCT Pub. Date: Jul. 26, 2012

(65) Prior Publication Data
US 2013/0269970 A1    Oct. 17, 2013

(30) Foreign Application Priority Data
Jan. 19, 2011 (JP) ................................. 2011-009304

(51) Int. Cl.
*H02G 3/04* (2006.01)
*B60R 16/02* (2006.01)
(52) U.S. Cl.
CPC .............. *H02G 3/04* (2013.01); *B60R 16/0215* (2013.01)
(58) Field of Classification Search
USPC ...................... 174/72 A, 72 R, 68.1; 439/207
See application file for complete search history.

(56) References Cited

U.S. PATENT DOCUMENTS 6,087,593 A * 7/2000 Skipworth et al. ............ 174/135
6,861,589 B2 * 3/2005 Katsumata et al. .......... 174/68.3

FOREIGN PATENT DOCUMENTS

| JP | 08-205360 | 8/1996 |
| JP | 10-271656 | 10/1998 |
| JP | 2005-189438 | 7/2005 |
| JP | 2009-207299 | 9/2009 |

OTHER PUBLICATIONS

International Search Report, mail date is Aug. 2, 2011.
U.S. Appl. No. 13/997,750 by Kazuo Hara entitled "Wire Harness Protector".
U.S. Appl. No. 13/976,226 by Kazunori Takata entitled "Wire Harness Protector".

* cited by examiner

*Primary Examiner* — Dhirubhai R Patel
(74) *Attorney, Agent, or Firm* — Greenblum & Bernstein, P.L.C.

(57) ABSTRACT

A splice housing projects from a bottom wall in a space on a side portion of a main pathway of a wire harness, the main pathway being bounded by the bottom wall and a circumferential wall of a main body of a protector. The splice housing includes dividing walls projecting at predetermined intervals and a sealing wall at one end of the dividing walls. A plurality of splice housing chambers are provided in alignment between the dividing walls. A side opposite the sealing wall of each of the splice housing chambers forms an opening for insertion. Each of the splice housing chambers has a height capable of accommodating splices on at least two vertical levels. Of the splices branching from the wire harness, splices having a splice sheet wrapped around an outer circumferential surface thereof and splices covered by an insulating resin cap are accommodated vertically adjacent.

5 Claims, 7 Drawing Sheets

WIRE HARNESS PROTECTOR

FIELD OF THE INVENTION

The present invention relates to a wire harness protector. In particular, the present invention enables numerous splices of the wire harness to be efficiently insulated and housed within the protector.

BACKGROUND OF THE INVENTION

A wire harness routed in a vehicle is configured by a cluster of numerous electric wires. A proportion of shielded wires in the electric wires configuring the wire harness has increased accompanying a sharp increase in electrically controlled components being mounted in vehicles. The shielded wires must have a grounded metal shielding layer and, when the shielded wires increase in number, shielding-added splices that connect the shielding layer to a drain wire increase in number. A wire harness connected to a large electronic control unit includes numerous shielded wires, and thus the splices branching off from the wire harness are also numerous and are likely to cluster at a terminal portion of the wire harness.

Moreover, in a case where circuits of a plurality of electric wires other than the splices for additional shielding are branched off and connected, when a number of connected electric wires becomes comparatively great, an insulating layer on a terminus of the electric wires may be stripped to expose a terminus of a strand, then the exposed strands may be overlapped with one another and the terminuses collectively welded to form a splice. Often, this collective terminus splice is accommodated in a cap made of an insulating resin.

In addition, a splice formed by the electric wires of the wire harness routed in an area exposed to water in an engine compartment or the like in an automobile must be waterproofed. Thus, in the shielding-added splice of the shielded wire, in many cases a portion connected to the electric wires is filled with a waterproofing agent such as a silicone resin and is then wrapped by a waterproofing sheet. Alternatively, in a case where the collective terminus splice is accommodated in the cap, the cap is filled with a dual-liquid waterproofing agent or the like, then the collective terminus splice is filled by a waterproofing agent.

In the above way, in a case where a number of splices for additional shielding increases in the wire harness due to an increase in a number of shielded wires connected to the electronic control unit, for example, and where the splices are waterproofed, each splice increases in size. Thus, ensuring a housing area capable of accommodating the splices in a way that ensures reliable insulation is not easy due to the increase in number and size of the splices.

Meanwhile, in a space where a restricted path for the wire harness and prevention of interference with other components are necessary, the wire harness passes through an interior of a molded resin protector. In a case where numerous splices branch from the wire harness, the splices are preferably accommodated in the interior of the protector.

Conventionally, in Japanese Patent Laid-open Publication No. H08-205360, the present applicants provide a protector 100 capable of accommodating splices, as shown in FIGS. 8(A), (B), and (C). Only a branch line 111 having a spliced portion 120 passes through the protector 100, the branch line 111 branching from a trunk line 110 of a wire harness. A spliced portion holder 103 is aligned in an entire width direction in a center portion of a wire pathway 101 within the protector 100. The spliced portion 120 of each branch line is passed through the respective spliced portion holder 103 and separately accommodated.

RELATED ART

Patent Literature

Patent Literature 1: Japanese Patent Laid-open Publication No. H08-205360

SUMMARY OF THE INVENTION

Problems to be Solved by the Invention

The protector of Patent Literature 1 is a protector chiefly employed for housing splices in which only a wire harness branch line including a splice is passed through the protector. Thus, a separate protector is needed when a trunk line of the wire harness and a branch line with no splices must also be passed through a protector. In such a case, two kinds of protectors are needed, thus increasing costs. Additionally, installation space for two kinds of protectors is needed and so there may be cases where the protectors cannot be installed due to space limitations.

Moreover, the protector 100 chiefly employed for housing splices only provides the spliced portion holders 103 arranged in parallel. Therefore, when a number of spliced portions to be housed becomes large, the protector 100 cannot be used. Instead, a new, larger protector must be provided and the protector must have a greater number of splice housings with greater widths. The protector 100 thus increases in size and is likely to deplete restricted amounts of space.

The present invention has been conceived in view of the above and provides a protector that includes a splice housing capable of accommodating the splices within a single protector even when the splices increase in number, the protector having a wire harness trunk line and a branch line with splices passed therethrough.

Means for Solving the Problems

In order to resolve the above problem, the present invention provides a wire harness protector configured with a molded resin sheathing an exterior of the wire harness routed in a vehicle. The protector includes a main body and a lid sealing an opening in a top surface of the main body, the main body having a bottom wall and a circumferential wall projecting from a circumferential edge of the bottom wall, the circumferential wall including an inlet and an outlet for the wire harness. A splice housing is provided in a space on a side portion of a main pathway of the wire harness, the main pathway being bounded by the bottom wall and the circumferential wall of the main body. The splice housing includes dividing walls projecting from the bottom wall at predetermined intervals and a sealing wall at one end of the dividing walls. A plurality of splice housing chambers are provided in alignment between the dividing walls. A side opposite the sealing wall of each of the splice housing chambers forms an opening for insertion. Each of the splice housing chambers has a height capable of accommodating splices on at least two vertical levels. Of the splices branching from the wire harness, splices having a splice sheet wrapped around an outer circumferential surface thereof and splices covered by an insulating resin cap are accommodated so as to be vertically adjacent.

The protector of the present invention enables the wire harness branch line with the splice, as well as the trunk line and branch line without splices, to be inserted. A main pathway is provided in an interior space of the protector main body running from the inlet to the outlet, the trunk line and branch line without splices being inserted through the main pathway. In addition, portions housing the splices are provided in alignment in a side portion of the main pathway. Thus, the splices from a plurality of branch lines branching from the trunk line of the wire harness routed along the main pathway from the inlet toward the outlet can each be inserted into and housed in a respective splice housing chamber. There is thus no need to include the protector chiefly employed for housing splices.

Each of the aligned splice housing chambers has a height capable of accommodating splices on at least two vertical levels. By making the splices covered by the insulating resin cap and the splices sheathed by the splice sheet adjacent when vertically stacking and accommodating the splices, insulation reliability can be maintained and numerous splices can be accommodated in the splice housing while rendering an insulating dividing plate unnecessary. Thus, for example, when the splice housing chambers are arranged in three parallel rows and defined with a height such that the splices can be accommodated by stacking in three vertical levels, three of the splices accommodated in the cap can be accommodated on the middle level and three of the splices sheathed by the splice sheet (a waterproofing insulating resin sheet) can accommodated on each of the top and bottom levels, thus enabling a total of nine splices to be accommodated.

A configuration is also possible which enables an opening for branch lines to be provided at a medial position on the circumferential wall of the protector main body, an electric wire having a splice to be passed through the opening for branch lines, and the splice to be accommodated in the splice housing chamber. With the above configuration, the splice of the branch line branching from the trunk line of the wire harness inserted through the inlet of the protector and along the main pathway can be accommodated in the splice housing chambers with the splice of the branch line inserted through the opening for branch lines and merging with the trunk line of the wire harness.

The circumferential wall provided on the protector main body is preferably configured with an outer wall having an arcuate shape and an inner wall. An interior space along the outer wall preferably defines the arcuate main pathway for the wire harness and includes an inlet and an outlet for the wire harness on both ends in a circumferential direction of the circumferential wall. In addition, the splice housing is preferably provided in contact with the inner wall between the inlet and the outlet.

The exterior shape of the protector is restricted by a relationship between a routing path of the wire harness and space for installation of the protector. However, an arcing portion on the circumferential wall has a comparatively large radius and, when a fixating bracket is provided on an outer surface of the inner wall, an overall shape is substantially a broad, rectangular shape, and the protector can be installed without the splice housing protruding toward an inner circumference of the main pathway.

The group of electric wires in the wire harness preferably includes a plurality of shielded wires. Additional splices grounding a shielding layer of the shielded wires are preferably sheathed by the splice sheet and accommodated in the splice housing chambers.

Thus, the wire harness connected to the electronic control unit includes numerous shielded wires, and therefore a concentration arises of shielding-added splices to the shielding layer of the shielded wires and to the grounded electric wires. Thus, when a splice housing is provided within the protector and the splice housing is capable of readily increasing, according to the number of splices, splice housing chambers capable of housing the numerous splices, usability of the protector can be improved. Splices inserted into the splice housing chambers are configured, as described above, with collective terminus splices covered by the insulating resin cap in contact with the shielding-added splices.

In addition, when the protector is installed in an area exposed to water such as an engine compartment, the splices accommodated in the splice housing chambers of the protector are waterproofed. The splices wound with the splice sheet are filled with a waterproofing agent configured by a silicone resin or the like, then the splice sheet is wrapped around the splice. Meanwhile, when the splice is covered by the insulating resin cap, a dual-liquid hardening waterproofing agent is dripped onto the cap and the collective terminus splice is inserted within the cap.

Effect of the Invention

As described above, when a wire harness inserted into a protector according to the present invention includes numerous splices, a splice housing is provided within the protector and, by accommodating the splices in the splice housing by vertically stacking the splices sheathed by the splice sheet and the splices covered and sheathed by the insulating resin cap, insulation reliability can be maintained while efficiently accommodating numerous splices.

MODE FOR CARRYING OUT THE INVENTION

Hereafter, an embodiment of a protector according to the present invention is described with reference to the drawings. A protector 1 according to the present embodiment is a protector for a wire harness routed in an automobile. The protector 1 of the present embodiment is installed within an engine compartment in an area exposed to water. The protector 1 is configured with a main body 2 and a lid 3 covering an opening in a top surface of the main body 2. Both are molded resin components.

Figure 1:
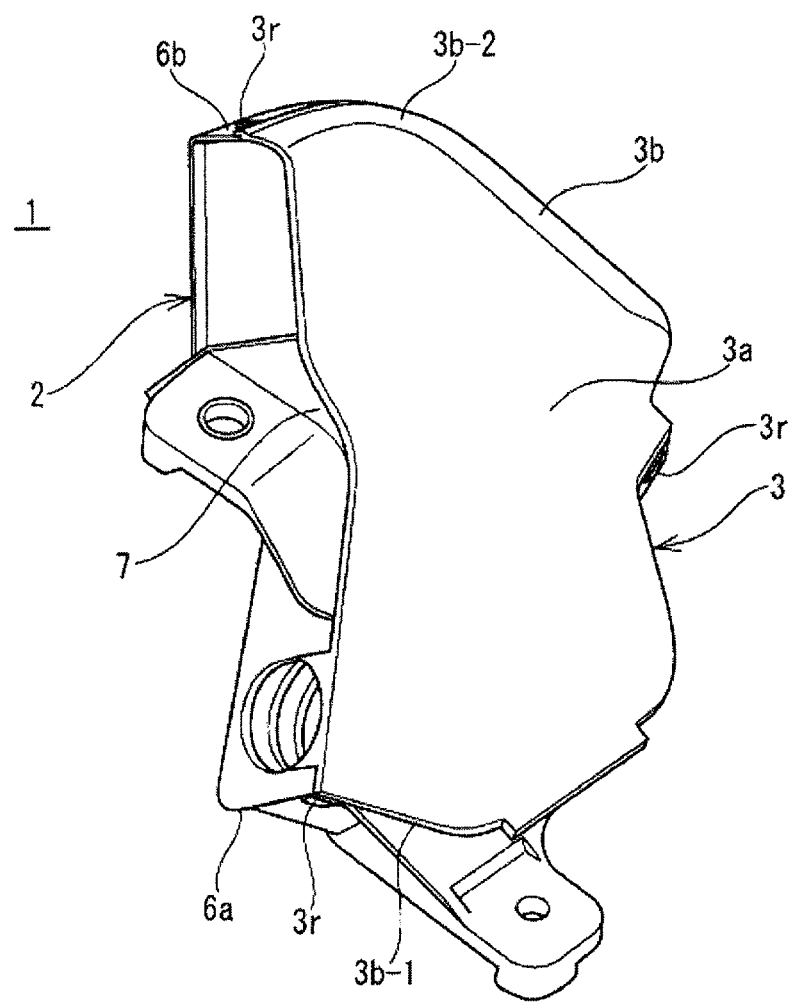
FIG. 1 is a perspective view of a protector according to an embodiment of the present invention.
Figure 2:
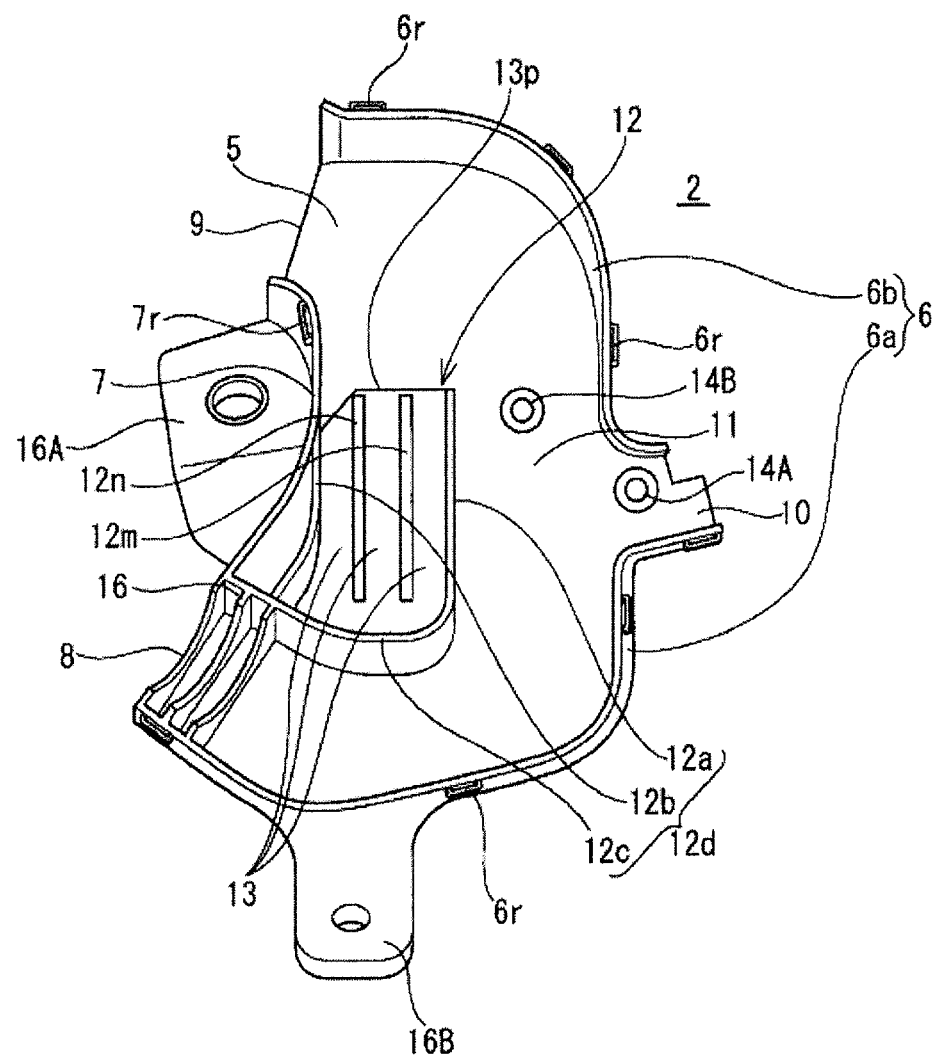
FIG. 2 is a plan view of a main body of the protector.
Figure 3:
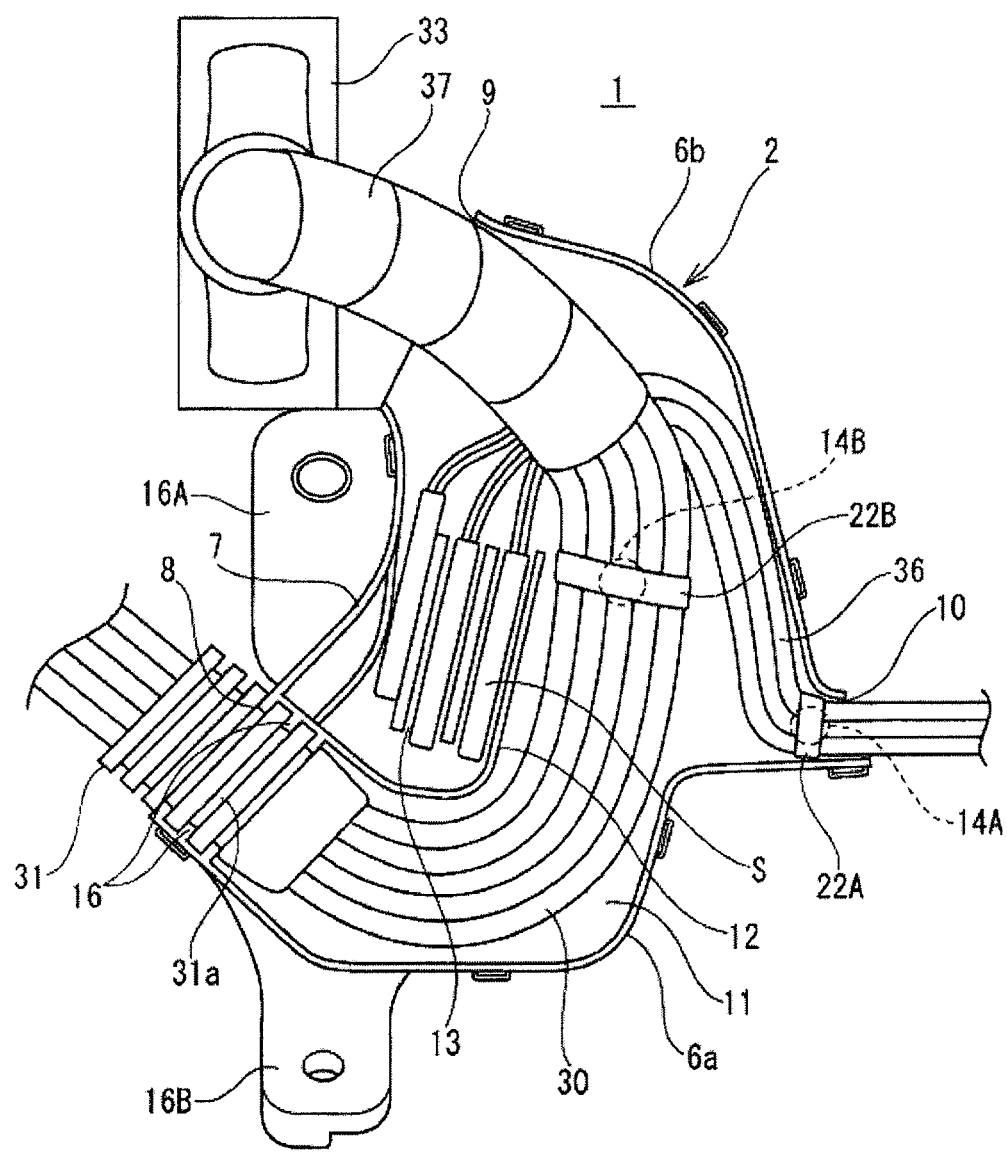
FIG. 3 is a plan view of a state in which a wire harness is inserted through the main body of the protector.
Figure 4:
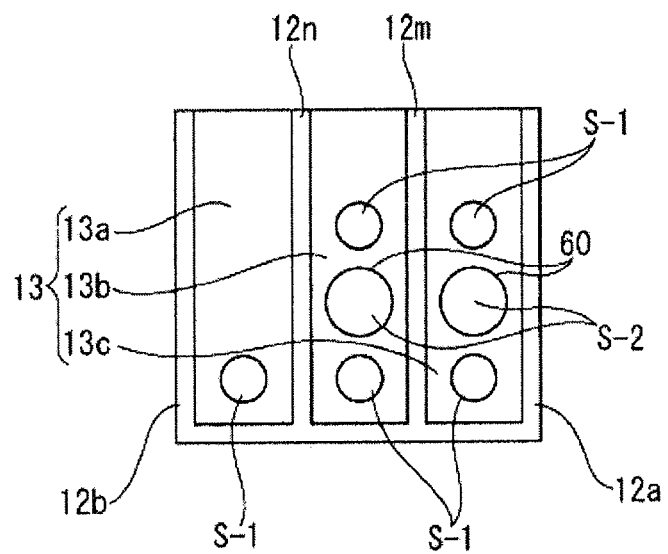
FIG. 4 is a schematic, explanatory view illustrating a state where splices are accommodated in a splice housing.
Figure 5:
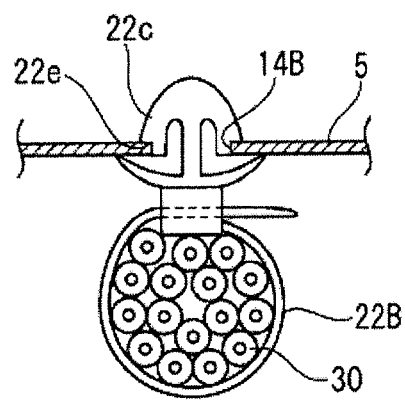
FIG. 5 illustrates a band clip wound around a wire harness and attached to a bottom wall.

As shown in FIGS. 2 and 3, the main body 2 includes a bottom wall 5 and a circumferential wall that comprises an outer wall 6 and an inner wall 7, which project from both width-direction sides of the bottom wall 5. The outer wall 6 has substantially a "C" shape overall, curving in a large arc. The inner wall 7 and the outer wall 6 provide, at both ends in a length direction, a wire harness inlet 8 and a wire harness outlet 9, both opening in the same direction.

The outer wall 6 of the main body 2 has a high wall 6a on the inlet 8 side and a low wall 6b on the outlet 9 side. The low wall 6b has an arcuate shape with a broad curvature. The high wall 6a is bent in substantially an "L" shape connecting a straight-line portion and a curved-line portion. An opening for branch lines 10 is provided between the low wall 6b and the high wall 6a. The inner wall 7 projects to the same height as the high wall 6a of the outer wall 6. Meanwhile, a top wall 3a on the lid 3 has the same shape as the bottom wall 5 of the main body 2. A circumferential wall 3b is provided to a circumferential edge of the top wall 3a, the circumferential wall 3b configured from a low wall 3b-1 in a position opposite to the high wall 6a on the main body 2 and from a high wall 3b-2 in a position opposite to the low wall 6b. In other words, the circumferential wall of the main body 2 is low on the outlet 9 side of the wire harness and is high on the inlet 8 side, an outer circumference being bounded by the high wall 3b-2 of the lid 3. Lock tabs 3r project at intervals on the circumferential wall of the lid 3 and lock frames 6r and 7r are provided on the outer wall 6 and inner wall 7 of the main body 2, the lock tabs 3r being inserted to engage with the lock frames 6r and 7r.

A main pathway 11 is provided in an interior of the main body 2, the main pathway 11 bending along an inner surface of the outer wall 6. The inlet 8 and outlet 9 at each end of the main pathway 11 open in the same direction. In addition, an opening for branch lines 10 is provided on the outer wall 6 at a medial position on the main pathway 11.

A splice housing 12 is provided projecting from the bottom wall 5 within the main body 2, located on an inner circumferential side of the main pathway 11. A height of the splice housing 12 is about the same as the height of the high wall 6a and the inner wall 7. The splice housing 12 includes an outer framing wall 12d having a "U" shape and two medial dividing walls 12m and 12n. The outer framing wall 12d is configured by two side walls 12a and 12b and a connecting wall 12c connecting one end of the two side walls 12a and 12b. The two medial dividing walls 12m and 12n are provided parallel to each other in medial positions between the two side walls 12a and 12b. Four dividing walls are thus provided, configured by the two side walls 12a and 12b and the medial dividing walls 12m and 12n, to provide in parallel rows three splice housing chambers 13 (13a to 13c) having substantially the same width. The connecting wall 12c forms a sealing wall for the splice housing chambers 13 and an opening for insertion 13p is formed on an opposite side. The opening for insertion 13p opens toward the main pathway 11 proximal to the outlet 9. Moreover, the opening for insertion 13p opens toward the low wall 6b, facilitating insertion of splices S into the splice housing chambers 13 through the opening for insertion 13p. One of the side walls 12a of the splice housing 12 and the connecting wall 12c double as an inner circumferential wall of the main pathway 11.

The two side walls 12a and 12b and the medial dividing walls 12m and 12n, which bound the three aligned splice housing chambers 13a to 13c, have heights which enable the splices S to be accommodated by being stacked on three levels (top, middle, and bottom). Thus, the splice housing within the protector 1 is capable of accommodating a total of nine splices.

Figure 7:
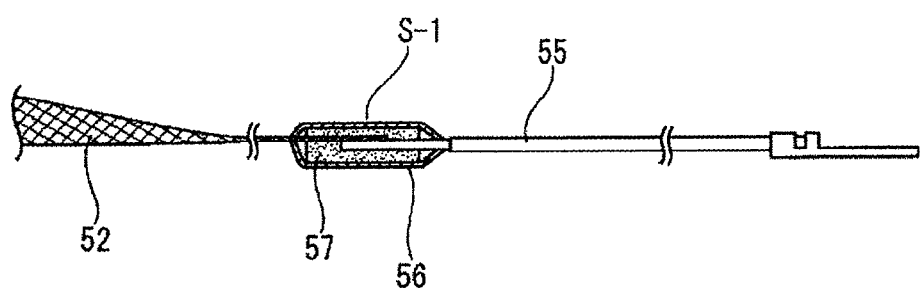
FIG. 7(A) illustrates a splice sheet wrapped around the splice of the shielded wire.
FIG. 7(B) illustrates a collective terminus splice covered by an insulating resin cap.
Figure 7B:
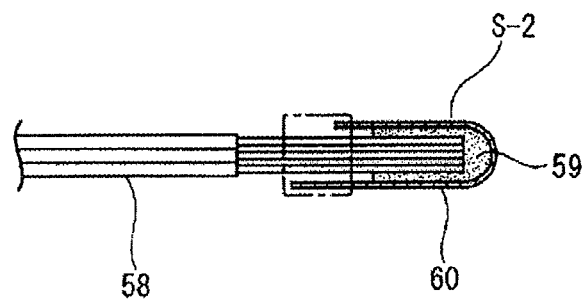
Figure 8:
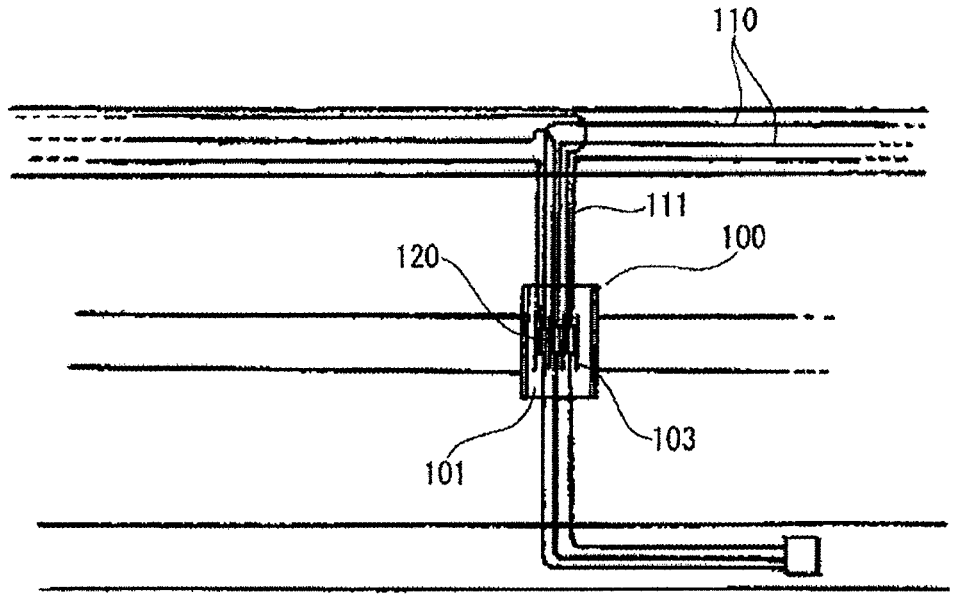
FIGS. 8(A)-8(C) depict a conventional example.
Figure 8B:
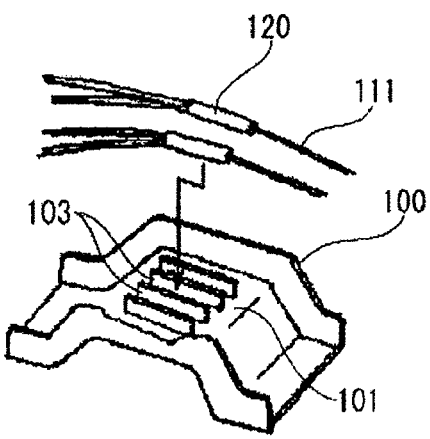
Figure 8C:
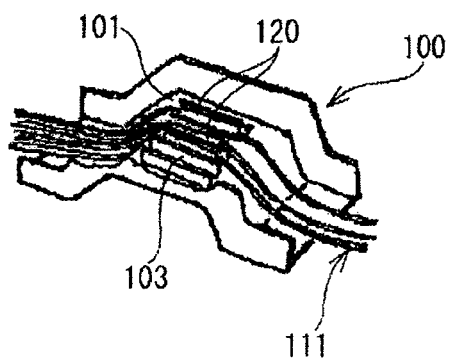

The splices accommodated by being vertically stacked in the same row are a shielding-added splice S-1 shown in FIG. 7(A) and a splice S-2 shown in FIG. 7(B) in which a collective terminus splice is accommodated in an insulating resin cap 60. The shielding-added splice S-1 and the splice S-2 are accommodated so as to be vertically adjacent. A wire harness including the splices is described below.

A bracket 16A for fixating to a vehicle body is provided on the main body 2 of the protector 1, projecting from an outer surface of the inner wall 7. In addition, a fixating bracket 16B is also provided to an outer surface of the outer wall 6.

A clip engagement hole 14A is provided on the bottom wall 5 of the main body 2 in a position proximal to the opening for branch lines 10. A band clip 22A bundles a plurality of branch lines drawn through the opening for branch lines 10, and a clip on the band clip 22A is inserted into and engaged to the clip engagement hole 14A. In addition, a clip engagement hole 14B is provided in a medial position on the main pathway 11 between the outer wall 6 and the side wall 12a of the splice housing. A band clip 22B bundles a group of electric wires in the wire harness 30 passing through the main pathway 11, and a clip 22c on the band clip 22B is inserted into the clip engagement hole 14B. An engagement stepped portion 22e on an engagement flange of the clip 22c engages to the clip engagement hole 14B. Moreover, the clip engagement hole 14B has a circular shape and is capable of rotatably holding the clip of the band clip 22B.

In addition, ribs 16 are provided projecting from inner surfaces of the outer wall 6, the inner wall 7, and the bottom wall 5, encircling the inlet 8 on the main body 2. The ribs 16 fit into valleys 31a on a corrugated tube 31 sheathing an exterior of a wire harness 30 which passes through the main pathway 11. The corrugated tube 31 terminates at a portion inserted past the inlet 8. The group of electric wires in the wire harness 30 is then bundled with the band clip 22B and the band clip 22B is engaged in the clip engagement hole 14B. Thus, the wire harness 30 drawn out from the outlet 9 is not fixated to the main body 2 at the outlet 9; instead, the wire harness 30 exiting from the outlet 9 is able to rotate within a necessary angular range around the engagement position of the band clip 22B as a pivot point. Accordingly, the width of the main pathway 11 from the clip engagement hole 14B to the outlet 9 includes a space 1.5 times or more the outer diameter of the wire harness 30 that allows oscillation of the wire harness 30.

A terminus of the wire harness 30 inserted through the main pathway 11 of the protector 1 connects to a connector 33 separated by a short space of 80 to 200 mm from an extraction point at the outlet 9 of the protector 1. In order to fit the connector 33 into a connector engagement portion on a device (not shown in the drawings) configured with an electronic control unit controlling an engine and fixated in the vehicle, the engagement work must be performed while rotating the connector 33. Rotation is therefore enabled at the outlet 9 of the protector 1.

Figure 6A:
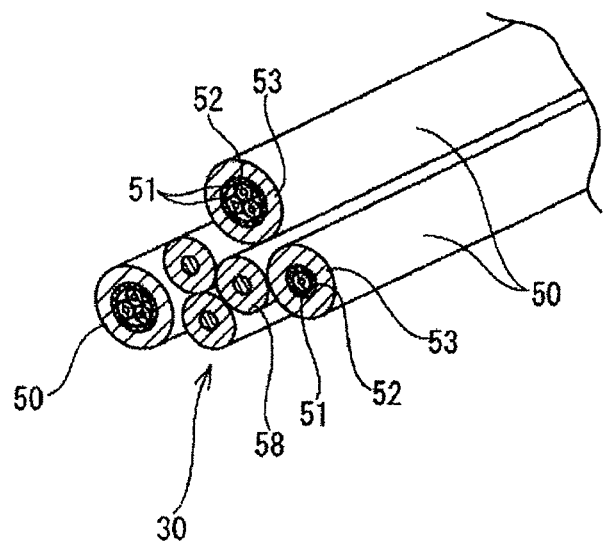
FIG. 6(A) is a schematic perspective view of a group of electric wires in a wire harness inserted through the protector.
Figure 6B:
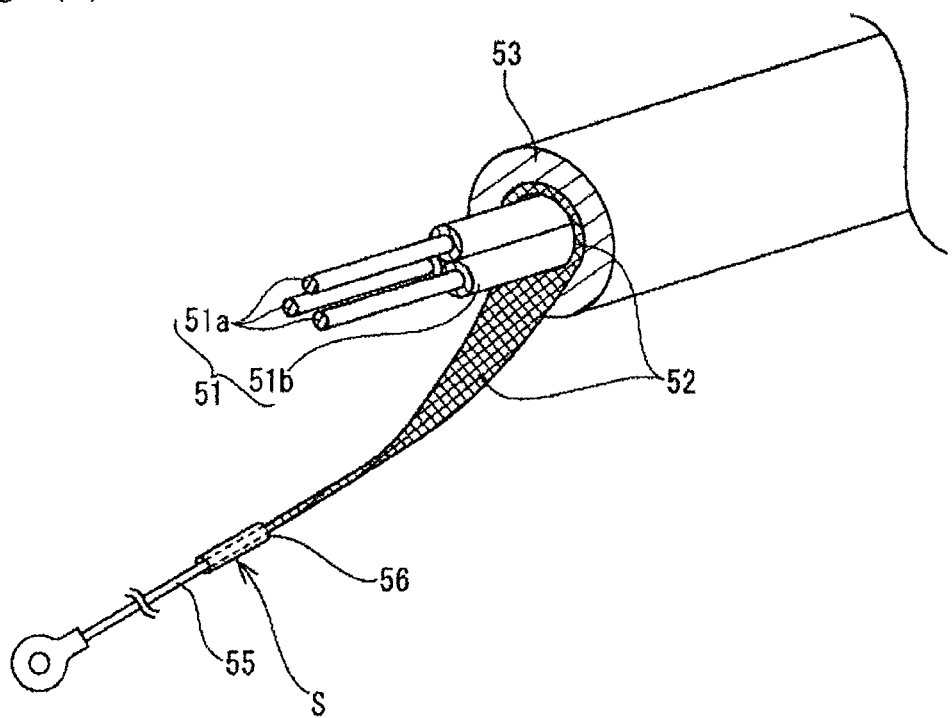
FIG. 6(B) illustrates a splice of a shielded wire included in the group of electric wires.

The wire harness 30 connected to the engine control unit by a connector includes numerous shielded wires 50 (shown in FIG. 6(A)) among the group of electric wires configuring the wire harness 30. In the shielded wires 50, one or a plurality of core wires 51 are covered by a shielding layer 52 configured with a braided metallic tube or a metallic foil tape. An outer circumference of the shielding layer 52 is covered with a sheath 53, which is composed of an insulating resin. The shielding layer 52 must be grounded. Therefore, as shown in FIG. 6(B), the sheath 53 is stripped from a terminus on a side connected to the connector to expose the shielding layer 52. The shielding layer 52 is extracted and soldered or welded to a drain wire 55. The shielded wires 50 are wired in the engine compartment in the area exposed to water and so, as shown in FIG. 7(A), a silicone resin 57 is filled into the connection area as a waterproofing agent, after which a splice sheet (insulating resin sheet) 56 is wrapped around the connection area to form the shielding-added splice S-1. Thus, the shielding-added splices S-1 are concentrated in a position proximal to the connector 33. An insulating layer 51b of the core wire 51 in the shielded wire 50 is stripped to expose the strand 51a, then a terminus of the strand 51a is crimped to a terminal (not shown in the drawings) inserted into and engaged with the connector 33.

The connector 33 is connected to both the terminus of the electric wires in a trunk line of the wire harness 30 as well as a terminus of a branch line 36 inserted into the protector 1 through the opening for branch lines 10. The branch line 36 also includes shielded wires and includes the shielding-added splice S-1. The shielding-added splices S-1 in the group of electric wires in the wire harness, which are inserted through the inlet 8 of the protector 1 and the opening for branch lines 10, are concentrated and inserted into each of the splice housing chambers 13 in the splice housing 12.

The group of electric wires in the wire harness 30 also includes the splice S-2, in which, in order to connect a circuit, terminuses of a plurality of electric wires 58 are resistance welded to form a collective terminus splice, which is then accommodated in the insulating resin cap 60. A dual-liquid hardening waterproofing agent 59 is then dripped onto the insulating resin cap 60 to form the splice S-2. In the present embodiment, there are two of the splices S-2 covered by the insulating resin cap 60 and five of the shielding-added splices S-1 cladded by the splice sheet.

At a point where the wire harness 30 is drawn out from the outlet 9, the wire harness 30 passing through the protector 1 is already tape-wound with the adhesive tape 37 and bundled to the branch line 36. In addition, the band clip 22A is tightened and fastened to the branch line 36 branching from the wire harness 30, and the band clip 22B is tightened and fastened to the wire harness 30, as well. Moreover, the corrugated tube 31 sheathes the exterior of a portion of the wire harness 30 inserted into the inlet 8. The corrugated tube 31 and the wire harness 30 are fixated to each other with adhesive tape.

To arrange the wire harness in the protector 1, the wire harness 30 is accommodated along the main pathway 11 of the protector 1 and the branch line 36 is drawn out through the opening for branch lines 10. The ribs 16 are fitted into the valleys 31a in the corrugated tube 31, which is thus positioned and held on the inlet 8 side. The clips on the band clips 22A and 22B are inserted into and engaged with the clip engagement holes 14A and 14B, respectively.

Next, the electric wires having the splices S-1 and S-2 are branched from the wire harness 30 and the branch line 36, and the three splices S-1 are respectively inserted into the splice housing chambers 13a to 13c. Next, two of the splices S-2 covered by the insulating resin cap 60 are stacked on an upper surface of each of the splices S-1 and inserted into the splice housing chambers 13b and 13c. Finally, the remaining two splices S-1 are inserted into the splice housing chambers 13b and 13c by being stacked on an upper surface of the insulating resin cap 60 of each of the splices S-2 in the splice housing chambers 13b and 13c. In this way, the splices S-1 are insulated by the insulating resin caps 60 by stacking the splices S-1 with the splices S-2 therebetween, such that the splices S-1 are not stacked directly atop each other.

In the above way, all of the splices S (S-1 and S-2) are accommodated in the respective splice housing chambers 13, which are divided into parallel rows. Also, because the insulating resin caps 60 are placed intermediately in vertical stacks, a resin plate defining vertical divisions is rendered unnecessary and, by defining vertical divisions with an insulating material, insulation reliability can be increased.

Even when the number of splices to be housed increases in the protector having the above-described configuration, the splices can be accommodated by being vertically stacked while maintaining insulation using the insulating resin cap 60, and thus an increase in the number of splices can be readily accommodated.

Moreover, the present invention is not limited to the above-described embodiment. A number of splice housing chambers arranged in parallel rows may be increased above three to four or five. When the number of splice housing chambers arranged in parallel rows is increased, a number of splices accommodated can be increased by two or three times, the splices being accommodated by vertical stacking within each splice housing chamber. Alternatively, a main pathway of a wire harness may have a straight-line shape, or a corrugated tube sheathing an exterior of a wire harness at an entrance of a protector may have projecting ribs for positioning and holding the corrugated tube. Still further, the protector is mounted in an area exposed to water and therefore the splices accommodated in the splice housing are also waterproofed. However, since splices are not waterproofed in areas not exposed to water, each splice becomes smaller and the splice housing can be made smaller. Alternatively, the number of splice housings can be increased.

DESCRIPTION OF REFERENCE NUMERALS

1 Protector
2 Main body
3 Lid
5 Bottom wall
6 Outer wall
7 Inner wall
8 Inlet
9 Outlet
10 Opening for branch line
11 Main pathway
12 Splice housing
13 (13a-13c) Splice housing chamber
14A, 14B Clip engagement hole
22A, 22B Band clip
30 Wire harness
31 Corrugated tube
33 Connector
50 Shielded wire
56 Splice sheet
S-1, S-2 Splice
60 Insulating resin cap

The invention claimed is:

1. A wire harness protector for covering a wire harness routed in a vehicle, the protector comprising:
a main body having a bottom wall and a circumferential wall projecting from a circumferential edge of the bottom wall, the circumferential wall including an inlet and an outlet for the wire harness;
a lid covering an opening in a top surface of the main body; and
a splice housing provided in a portion of the bottom wall that is adjacent to part of the circumferential wall,
a main pathway for accommodating the wire harness being defined at least partially by the bottom wall, a side wall of the splice housing and the circumferential wall of the main body,
wherein the splice housing further includes dividing walls, each having a first and second end, projecting from the bottom wall at predetermined intervals and a connecting wall positioned at the first ends of the dividing walls, a plurality of splice housing chambers are provided in alignment between the dividing walls, a side opposite the connecting wall of each of the splice housing chambers forms an opening for insertion, and each of the splice housing chambers has a height capable of accommodating splices on at least two vertical levels, and wherein the splice housing chambers are configured to accommodate splices branching from the wire harness including one splice having a splice sheet wrapped around an outer circumferential surface and another splice covered by an insulating resin cap being vertically adjacent.

2. The wire harness protector according to claim 1, wherein an opening for branch lines is provided at a medial position on the circumferential wall of the protector main body, the opening for branch lines being configured to allow passage of an electric wire having a splice, and one of the splice housing chambers being configured to accommodate the electric wire.

3. The wire harness protector according to claim 1, wherein the circumferential wall provided on the main body comprises both an outer wall having an arcuate shape and an inner wall, wherein an interior space along the outer wall defines an arcuate main pathway for the wire harness, the circumferential wall includes an inlet and an outlet for the wire harness on both ends in a circumferential direction of the circumferential wall, and the splice housing is in contact with the inner wall between the inlet and the outlet.

4. A wire harness assembly including the wire harness protector of claim 1, wherein a group of electric wires in the wire harness comprises a plurality of shielded wires, and additional splices grounding a shielding layer of the shielded wires are sheathed by the splice sheet and accommodated in the splice housing chambers of the protector.

5. A wire harness assembly including the wire harness protector of claim 1, wherein the protector is installed in an engine compartment in an area exposed to water, the splices accommodated in the splice housing chambers are waterproofed, and wherein the splice wrapped with the splice sheet is filled with a waterproofing agent before the splice sheet is wrapped around the splice, and the insulating resin cap is filled with a waterproofing agent.

\* \* \* \* \*